(12) United States Patent
Smith

(10) Patent No.: US 11,021,888 B1
(45) Date of Patent: Jun. 1, 2021

(54) TOWABLE CELL PHONE TOWER RAISING RIG

(71) Applicant: Anthony J. Smith, Annapolis, MD (US)

(72) Inventor: Anthony J. Smith, Annapolis, MD (US)

( * ) Notice: Subject to any disclaimer, the term of this patent is extended or adjusted under 35 U.S.C. 154(b) by 27 days.

(21) Appl. No.: 16/676,611

(22) Filed: Nov. 7, 2019

Related U.S. Application Data

(60) Provisional application No. 62/756,692, filed on Nov. 7, 2018.

(51) Int. Cl.
  *E04H 12/34* (2006.01)
  *B62D 63/06* (2006.01)

(52) U.S. Cl.
  CPC ......... *E04H 12/345* (2013.01); *B62D 63/061* (2013.01)

(58) Field of Classification Search
  CPC ............................ E04H 12/345; B62D 63/061
  See application file for complete search history.

(56) References Cited

U.S. PATENT DOCUMENTS

| 2012/0167485 | A1* | 7/2012 | Trevithick | E21B 15/00 52/112 |
| 2016/0060893 | A1* | 3/2016 | Roodenburg | E04H 12/187 52/123.1 |
| 2016/0251869 | A1* | 9/2016 | Deel | E04H 12/34 52/116 |
| 2017/0096832 | A1* | 4/2017 | Robb | G01S 17/08 |
| 2020/0048965 | A1* | 2/2020 | Chen | E21B 15/003 |
| 2020/0055438 | A1* | 2/2020 | Couch | B60P 3/075 |

* cited by examiner

*Primary Examiner* — Gisele D Ford
(74) *Attorney, Agent, or Firm* — James Creighton Wray

(57) ABSTRACT

A trailer carrying a utility pole has parallel spaced beams and transverse interconnections at a front and spaced inward from a rear of the beams. Rests on top of the interconnections support a pole-holding channel that is connected to the beams with plural pivoted frames. A wire passes through turning blocks at a rearward end of the channel and near the rearward interconnection, rotating the frames and pulling the channel towards the rearmost transverse interconnection until the channel holds the pole upright. The trailer is lowered and the pole is connected to a prepared supporting block. The channel is detached from the pole. The channel and frames are lowered by releasing the wire, and the trailer is raised and towed away.

15 Claims, 20 Drawing Sheets

TOWABLE CELL PHONE TOWER RAISING RIG

This application claims the benefit of U.S. Provisional Application No. 62/756,692 filed Nov. 7, 2018, which is hereby incorporated by reference in its entirety as if fully set forth herein.

BACK GROUND OF THE INVENTION

There are currently 86,000 cell phone towers in America. With the latest new technology it is anticipated that there will be a need for 800,000 cell phone towers by 2025.
Current Cell phone towers are delivered in sections and then erected using a crane. The electronic equipment in the early towers was installed by skilled technicians that also needed a crane to add the electronics to the top of the tower. Then the electronics on the tower were tested. The erections of the early cell phone towers were very labor intensive. Each tower could take weeks or months to complete and required the use of an expensive heavy crane with its operator. It became obvious that it was much more reliable if all the electronics were installed at the factory. Delivering the tower in sections and using a crane to assemble the tower defeated the object of installing all the electronics at the factory. There is now a serious skilled labor shortage.

There is a need for a quick shorthanded method of erecting the cell phone tower in one piece and fully equipped with electronics.

In 2008 I developed a method of raising a fully rigged 40 ft mast on a trailer-able Trimaran from a trailing position horizontal across the top of the boat to a vertical position ready to sail. This operation took only minutes and could be accomplished by a single person with minimum effort using the manual winches at the back of the cabin.

SUMMARY OF THE INVENTION

In March 2008 U.S. Pat. No. 7,341,014 B2 can be seen as a method of raising a 39 ft sail boat mast. This invention allowed a single operator, with just a rope going to manual winch at the back of the cabin, to raise the mast from the horizontal to the vertical sailing position easily and quickly. Using that technology it was felt that it would be possible to raise any tower.

The location and lengths of the struts on the four frames A, B, C and D dramatically reduce the load necessary to raise the mast. The loads on a single line without any pulley blocks are not much more than the weight of the mast, and that is only at the beginning of the lift. Once the initial load has been overcome, the loads to raise the mast are rapidly decreased. The mast can be raised in minutes. The mast can also be lowered easily. The frames also stabilize the mast as it goes up. The raising operation is safe because the center of gravity of the mast stays basically above the mast base, and the frames stabilize the mast during the raising operation.

Initially it was felt that the towers and the base could be modified with struts to raise the tower and leave the struts in place. The struts could be removed and used on another tower. Eventually it was realized that a separate highway towable rig with all the struts in place could be used to raise multiple towers. After the tower was bolted in pace the rig could be removed to go and raise another tower. With this rig the towers did not need any special design for erection. The towers could be fully rigged with all the electronics. The towers could even have decoration to reduce the complaints from the community.

Hydraulic Boat Trailer

There exists on the market a device called a hydraulic boat trailer, as seen in the photographs shown in FIGS. 19 and 20. These trailers which come in many sizes can be towed on the highway and carry boats as large as 60 ft weighing 40,000 lbs. I felt that struts similar to those used on the sail boat mast raising could be attached to the hydraulic boat trailer for raising towers.

A hydraulic boat trailer has two strong 12" box frames down each side. They are spaced apart so that the outside width is towable over the road at 8' 6". The side frames are connected together only at the front. There are wheels at the back of the trailer with hydraulic rams so that the height of the trailer can be adjusted up or down. The front of the trailer attaches to a pickup truck or tractor unit and is also adjustable up and down. On the top of the boat trailer side frames, are hydraulic rams with pads to support a power or sail boat.

Normally, when in use as boat trailers to move boats over the road these trailers, open down the middle, are backed down either side of the boat keel and inside the boat jacks. The hydraulic boat pads are raised to support the boat. The boat is lifted off the ground and driven away.

In an example, for tower raising operation the boat pad would be replaced with four frames. For the purpose of this description I am assuming a trailer 36 ft long and 8 ft wide. Two of these frames A and B are attached on the inside towards the back of the side box beams of the trailer, and the frames face backwards. The other two frames C and D are attached to the top of the side box beams roughly in the middle of the trailer and go forward to start the raising operation and then guide the tower-holding channel. There is a 36 ft channel custom built to support the tower above the trailer that rests on 3 ft high supports 80 and 81 on the trailer.

The main frame A has struts that are 9 ft long and are pivotally attached to the top of the box on each side about 7' forward of the back of the trailer. This frame is attached to the overhead channel about 11' forward from the back. Frame B has struts that are 7 ft 9 in and would be pivotally attached to the inside near the underside of the trailer side box each side. The struts of frame B would be attached to the overhead channel 6 ft forward from the back.

Frames C and D have struts that are all 13 ft long and are pivotally attached at the same location on the top of the trailer side box beams 10' forward of the back. These frames face forward. Frame C is on the inside of the pivot and goes to the underside of the channel, where the two side struts are connected together, and to a roller that runs on an "I" beam on the underside of the channel. There is an extension that goes out laterally from the roller connection the width of the tower channel. This extension is for the attachment of the control wires that are outside the tower channel. The bottoms of the struts of frame D are attached to the outside of the pivot on the tops of the box beam and goes above the tower channel. The two side struts of frame D are connected together above the tower channel with a removable bar longer than the width of the tower channel. The control wire that goes outside the tower channel is connected to the tops of the struts of frame D.

The channel is custom made to take the bottom part of the tower.

These and further and other objects and features of the invention are apparent in the disclosure, which includes the above and ongoing written specification, with the drawings.

DETAILED DESCRIPTION

Hydraulic Boat Trailer

Figure 19:
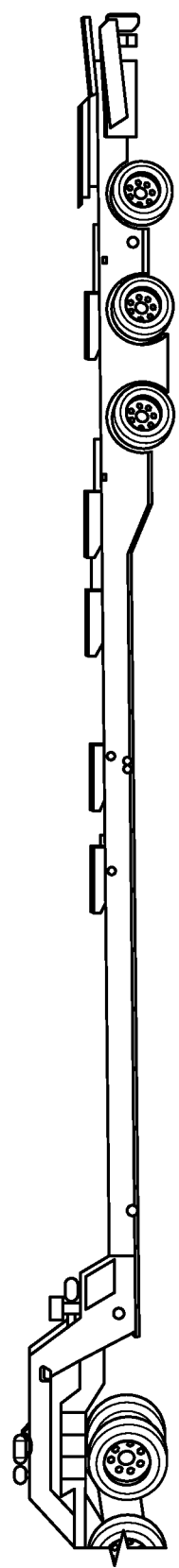
FIG. 19 is a photo showing a side view of a hydraulic boat trailer to be modified.
Figure 20:
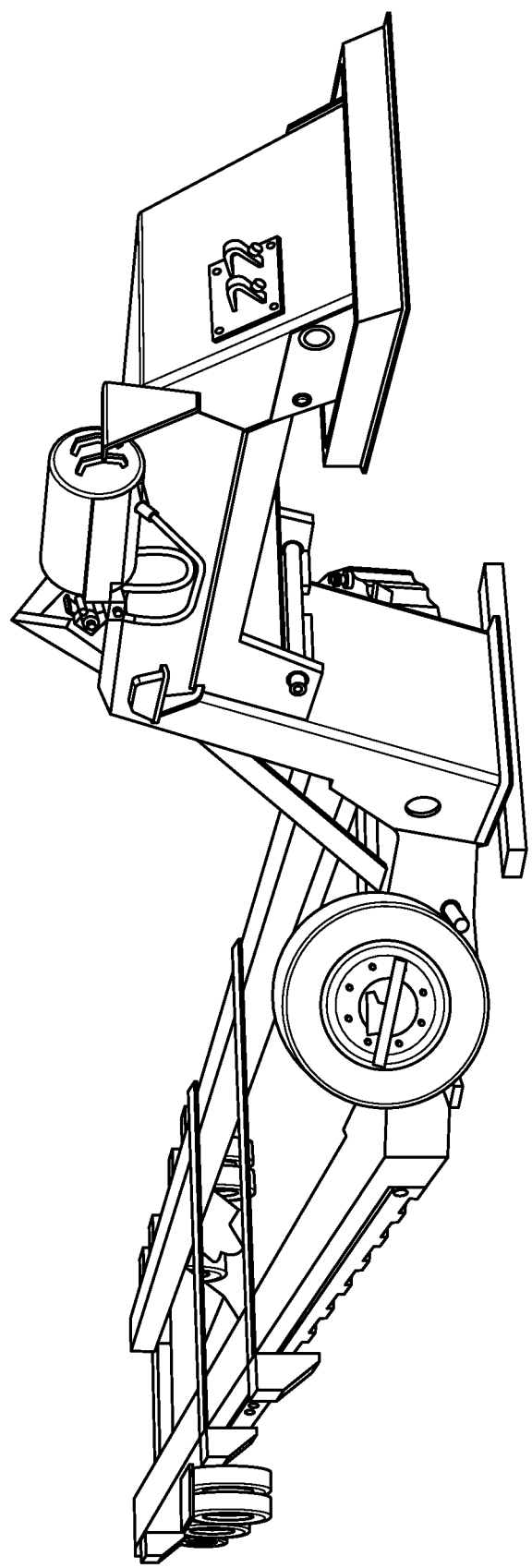
FIG. 20 is a photo showing a perspective view from the front of the trailer.

An over the road trailer such as shown in FIGS. 19 and 20 can be purchased from companies such as Conolift or Hostar. These companies and others make hydraulic boat trailers that can go over the road when attached to a pickup truck or to a tractor unit of a tractor-trailer. These companies make trailers to carry loads up to 40,000 lb and 65 ft. For the purpose of explanation of the invention, a trailer 36 to 40 ft long and 8 ft wide with a capacity of 20,000 lbs was selected. The trailer selected had twin rear wheel assemblies with hydraulic rams that raise or lower the trailer. The trailer had a simple 12" square side box beam frame with no boat handling equipment.

Figure 1:
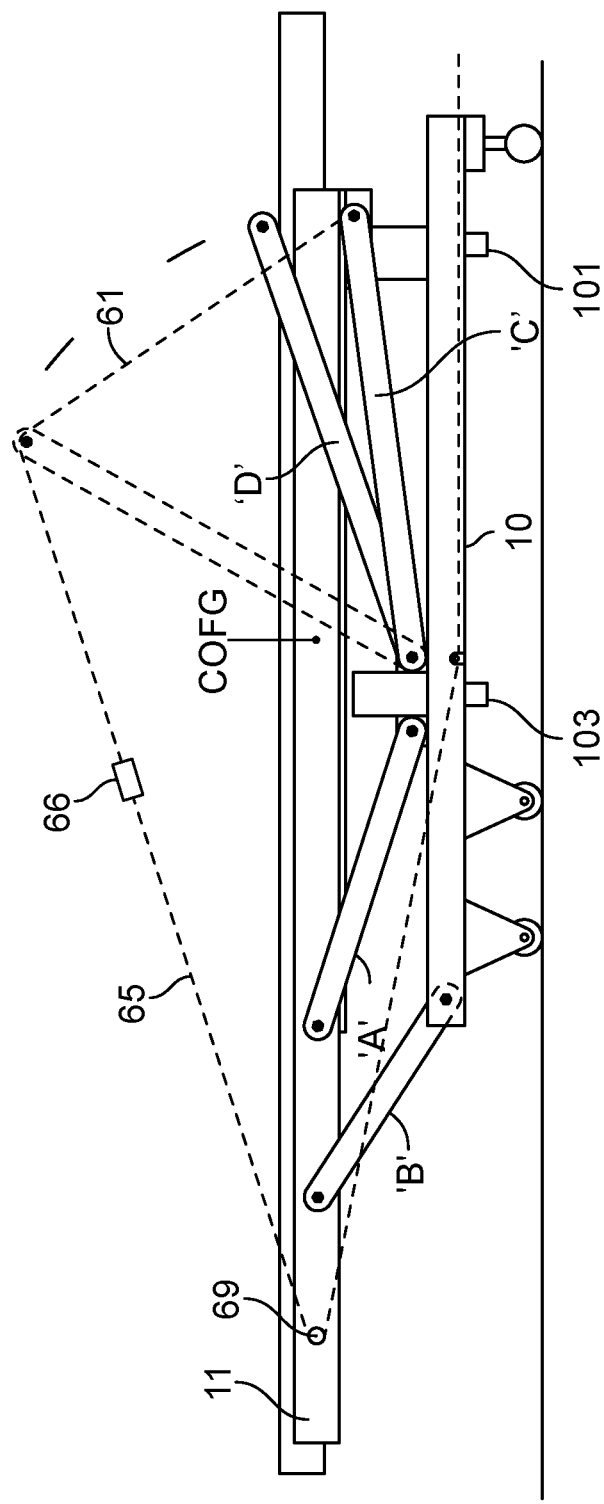
FIG. 1 is a side view of assembled trailer with mast in place ready to be raised. The dotted lines show the frame D, raised ready for erecting the tower.

FIG. 1 shows the inside of one side box beam in a trailer scale model 1.

Figure 2:
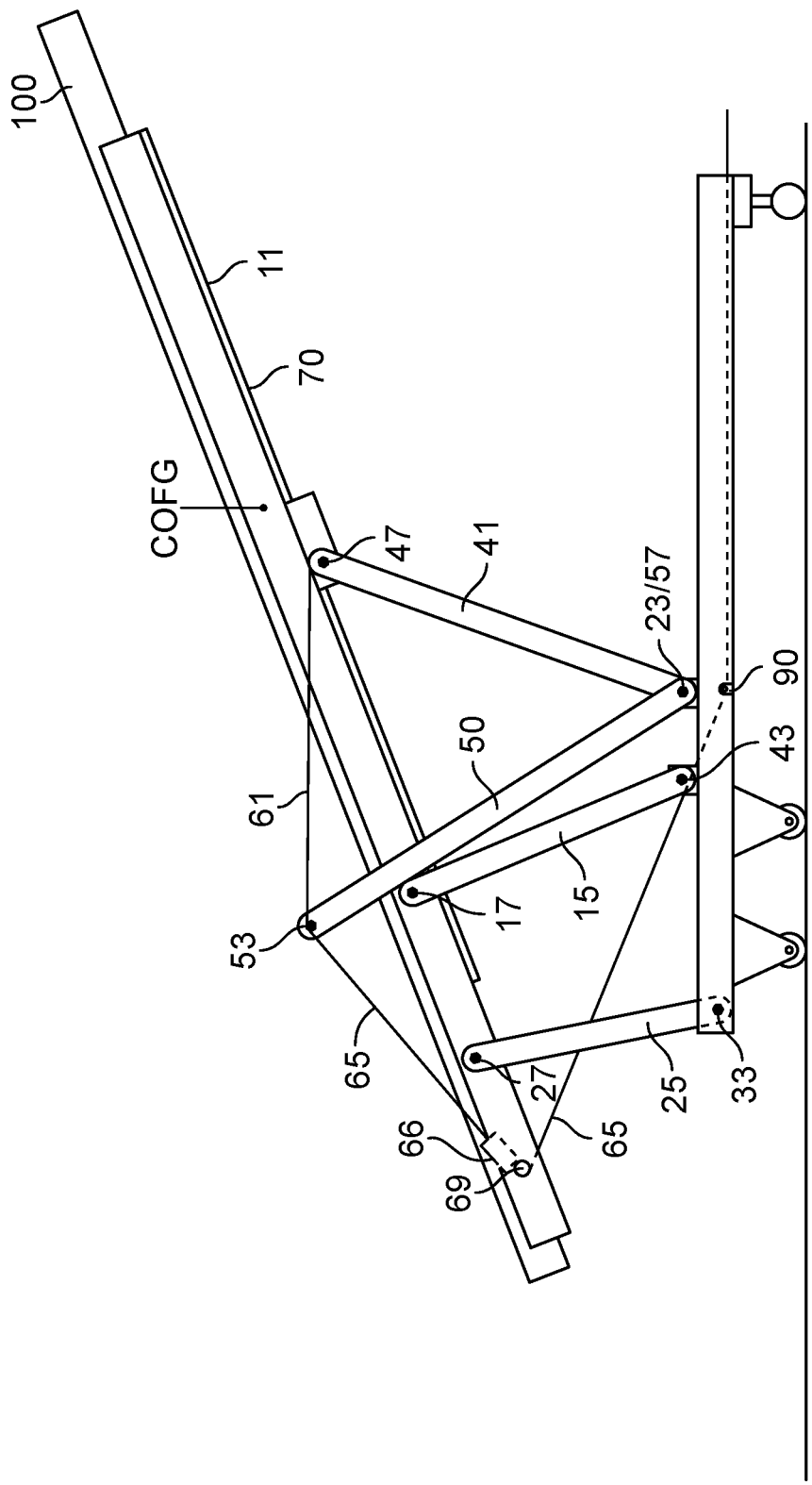
FIG. 2 is a side view of mast raised using only frames C and D.

As shown in FIGS. 2 and 6, pivot plates 33 and 32 are welded on the underside of the side box beam frames on the inside 3 at the back. Additional pivot plates 71 and 70 and 43 and 42 were welded on the top of the side box frame 5 3 ft and 7 ft forward from the back of the trailer. Dimensions herein are in measurements of the actual trailer. Other pivot plates 23 and 22 and 57 and 58 are welded in the center and on the top of the box side frame 10 ft forward from the back.

Two fixed reinforced 3 ft wide and 8 ft long plates are welded to the underside of the box frame across the trailer between the side frames. These plates also are used to lock the base of the tower when erected. The center of these plates is 8 ft 6 in and 21 ft forward from the back of the trailer. On these plates are support blocks 80 and 81. Each block is 3 ft high and 2 ft square in the center. On these plates are attached turning blocks 90 and 91 shown in FIGS. 9-14 on either side of the support blocks 80 and 81.

On each side of the trailer are two laterally extensible retractable and vertically adjustable hydraulic support pads 101 and 103 extending from the side of the square frames, 8 ft 6 in and 21 ft from the back of the trailer. At the back of the trailer on each side are added two more retractable and vertically adjustable support pads. These stabilizer pads are more effective than pneumatic tires on the back of the trailer to stop the tower from tipping.

Lifting Frames

There are four lifting frames A, B, C and D pivotably connected to the box beams. These frames have struts that are pivotally attached on either side of the trailer and the tower-holding and raising channel. The struts are stiff box section tubes with plates at the ends to attach them pivotally to the hydraulic trailer and the overhead tower channel. The frame A takes most of the weight and must be capable of supporting the weight of the tower.

The struts 25 of frame B are 9 ft long with pivots at the ends and 1 ft 3 in from the bottom. These struts are pivotally attached to the trailer under the side box on beams each side 32 and 33 using the pivot 1 ft 3 in in from the bottom end. The other pivots at the ends of the struts of frame are used for collapsing the rig using plates 70 and 71 shown in FIGS. 6A and 7 on the top of the box for over the road and when empty. The struts 15 of frame A are 9 ft long pivotally attached on each side to the top of the trailer 42 and 43 side box beams 7 ft forward from the back of the trailer.

The struts 41 of frame C are 13 ft long and pivotally attached to the top of the trailer side box beams inside the welded pivot plates 22 and 23 on each side. The pivot plates are 10 ft forward from the back of the trailer. The upper end of this frame is pivotally attached to a roller 46 and 47. The roller runs down an "I" beam on the underside of the tower channel and laterally stabilizes and lifts the tower channel. There is an extension that goes laterally out from the roller assembly. The extension is for the attachment of two 11 ft fixed wires 61 and 60 that go outside the tower channel and attach to the tops of struts 50. The struts 50 of frame D are 13 ft long and are pivotally attached to the plates 22 and 23 on their outsides. The upper ends of the struts are attached together with a bar 52 and 53 that spaces the frame apart the width of the tower channel. This bar is removable. The control wires 65 and 64 and the fixed wires 61 and 60 are attached to the upper end of the struts 50 of frame D.

Mast Channel

A mast-holding and raising channel 11 is 36 ft long and is custom made so that the tower will fit inside the channel when the channel is held above the trailer and is rested on the two 'supports 80 and 81. There are pivot points 27, 28 on the channel for the struts 25 and 26 of frame B. Pivot points 27, 28 are 7 ft forward from the back of the channel. The pivot points 17, 18 of the struts 15 of frame A are 12 ft from the back of the tower channel on each side.

There is a 6 inch I beam 70 attached to the underside of the tower channel 11 that runs the full length of the tower channel. A roller 46 runs on the "I" beam and is attached to the struts 40, 41 of frame C at their upper ends.

On each side of the tower channel is a wire turning block 68 and 69, as shown in FIGS. 1 and 2, located 3 ft forward of the back of the channel. There is a plate with a hole in it through which the wires go just before the turning block. This plate is welded to the tower channel and is the stop for the plate 66 and 67 that is part of the control wire 65 and 64. The plates 66 and 67 on the control wire are 10 ft away from the 52 and 53 attachment point on the top of the struts of frame D 50 and 51.

There are removable chain connection points on the outside of the tower channel to secure the tower during the raising operation. There are also stops on the side of the tower to prevent the tower from sliding down when the tower goes up.

The side and rear stabilizer on the trailer are located so that the center of gravity of the tower is always inside these stabilizers to prevent tipping.

Operation

Base

Before the tower can be erected a reinforced concrete base has to be constructed. The site is cleared and a hole dug. Concrete is poured into the hole with reinforcement. The reinforcement is connected to threaded studs that stand up above the base. The orientation and location of the studs is set to line up with the holes in the base of the tower.

Setting Up Trailer and Tower

The tower can be delivered in sections and assembled on the tower channel. If permitted over the road, the tower can be delivered to the site in one piece. The tower is fully rigged with all the electronics.

The hydraulic trailer is maneuvered so that the opening at the back of the trailer is over the concrete bolting base. The wheel hydraulics are operated to raise the trailer. The side and rear stabilizers are extended and moved down to take load on fixed pads on the ground rather than road tires. The stabilizers also level up the rig.

Raising the Tower

Stage one is the initial raising of the tower using frames C and D, as shown in FIG. 1. An electric winch with a capacity equal to twice the weight of the tower is mounted on the front 201 of the trailer 20. The electric winch pulls wire 65 and 64 running down the side of the tower channel. The wire pulls up frame D until the 11 ft wire 61 to frame C is tight.

Continued operating of the electric winch pulls the control wire 65 and 64 and raises frame D 50 and frame C 41, as shown in FIG. 2. The tower starts to go up. The control wire 65 and 64 not only raises frame C 41 and D 50 but also pulls the base 71 of the mast 70 forward. The combination of pulling the mast up at the same time as it is pulled forward reduces the load that would exist if the individual operations were done on their own.

Eventually the stop plate 66 and 67 on the control wire 65 that is 10 ft forward from frame D 50 abuts the fixed plate just in front of the turning block 69. At that point the control wire 65 and 64 stops pulling up frame D 50 and frame C 41.

Figure 3:
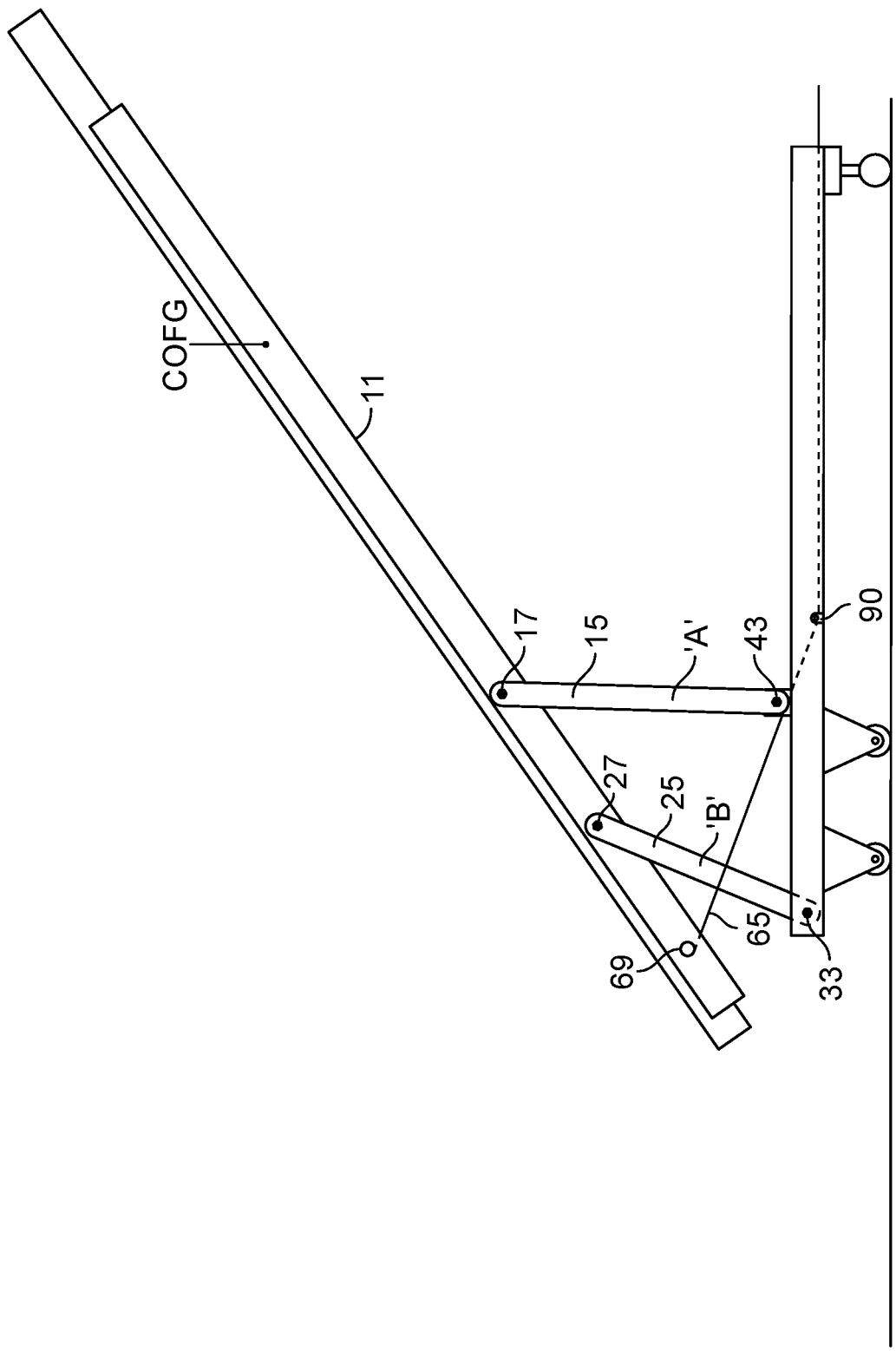
FIG. 3 is a side view at the start of frames A and B taking over and starting to raise the tower.
Figure 4:
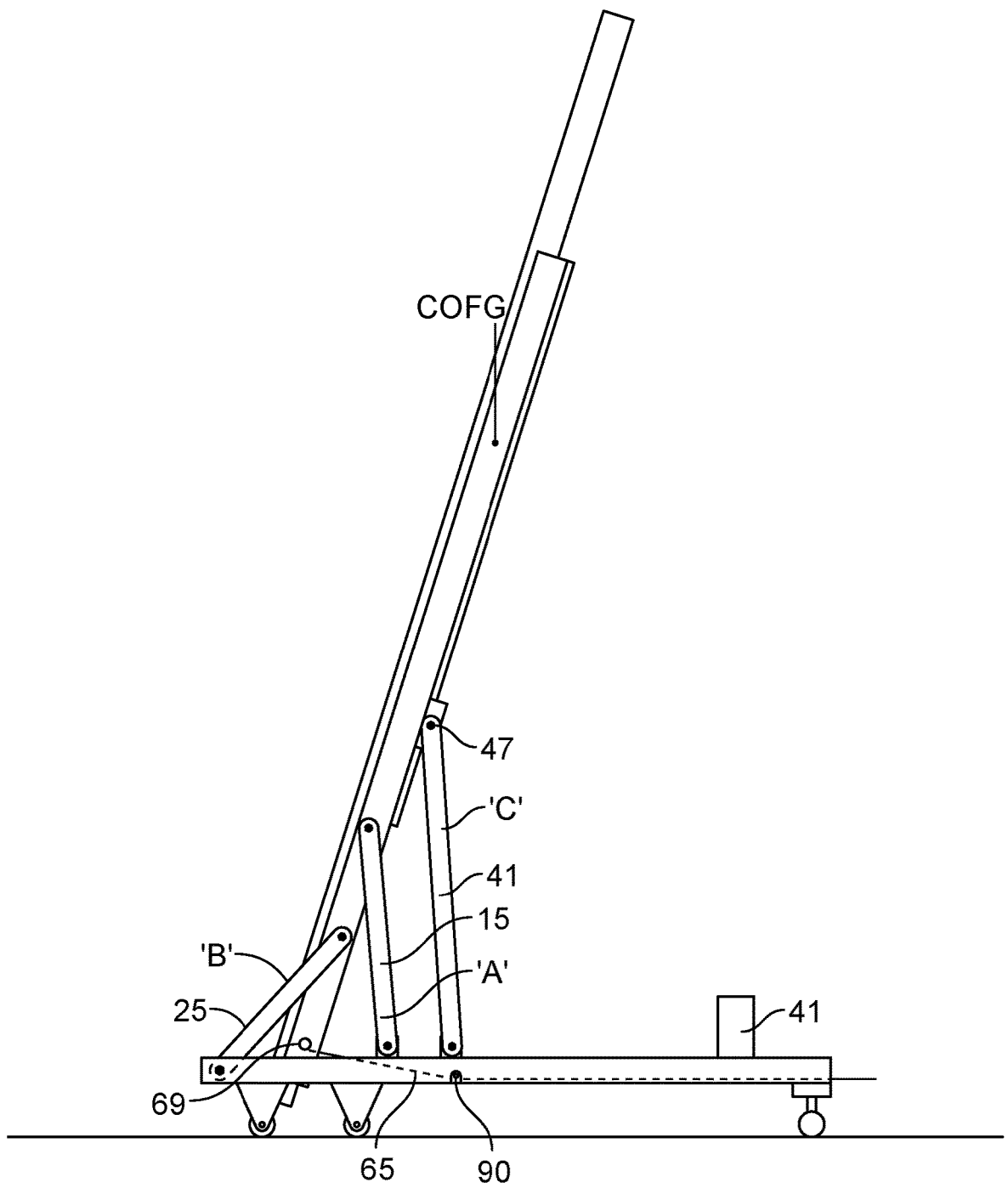
FIG. 4 is a side view of mast continuing to be raised.
Figure 5:
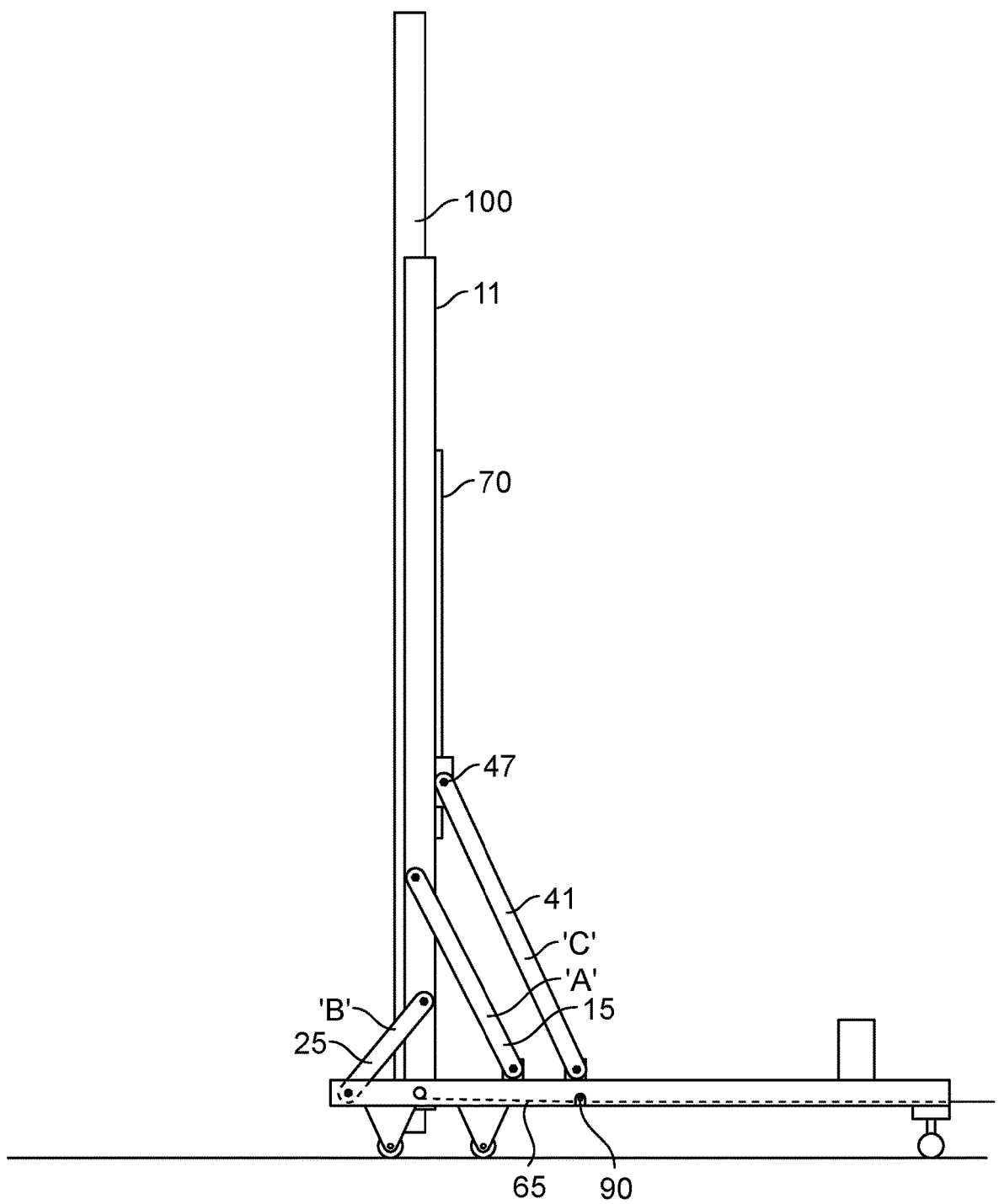
FIG. 5 is a side view of mast fully raised to vertical.
Figure 6A:
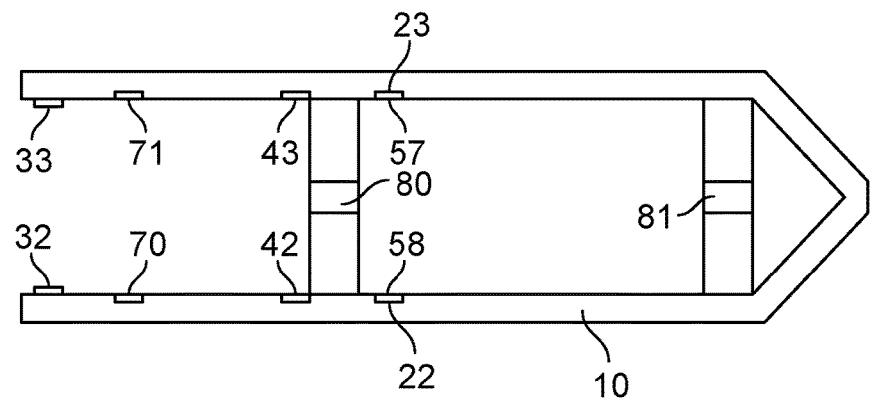
FIGS. 6A and 6B are plan and side views of the trailer model
Figure 6B:
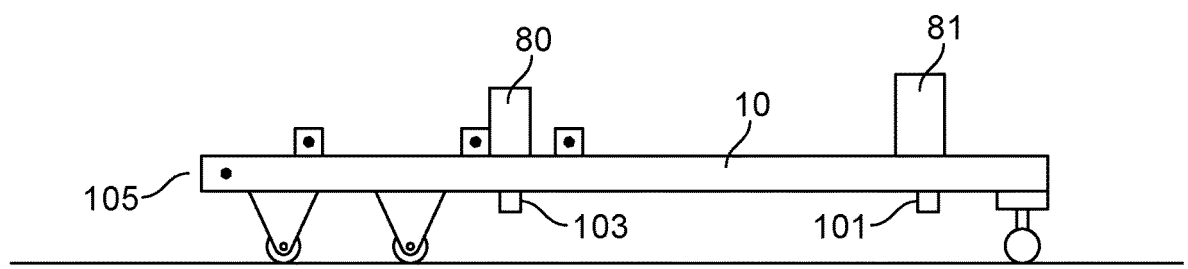
Figure 7:
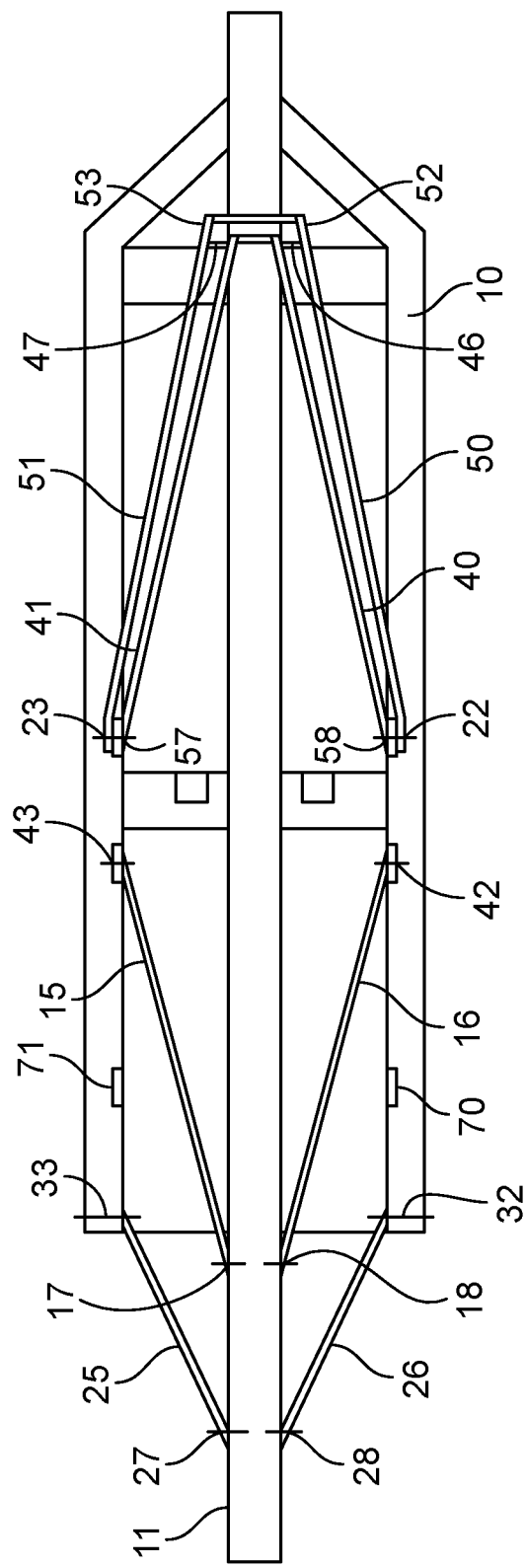
FIG. 7 is a plan view of the trailer with four frames in position and dotted lines showing the channel.
Figure 8:
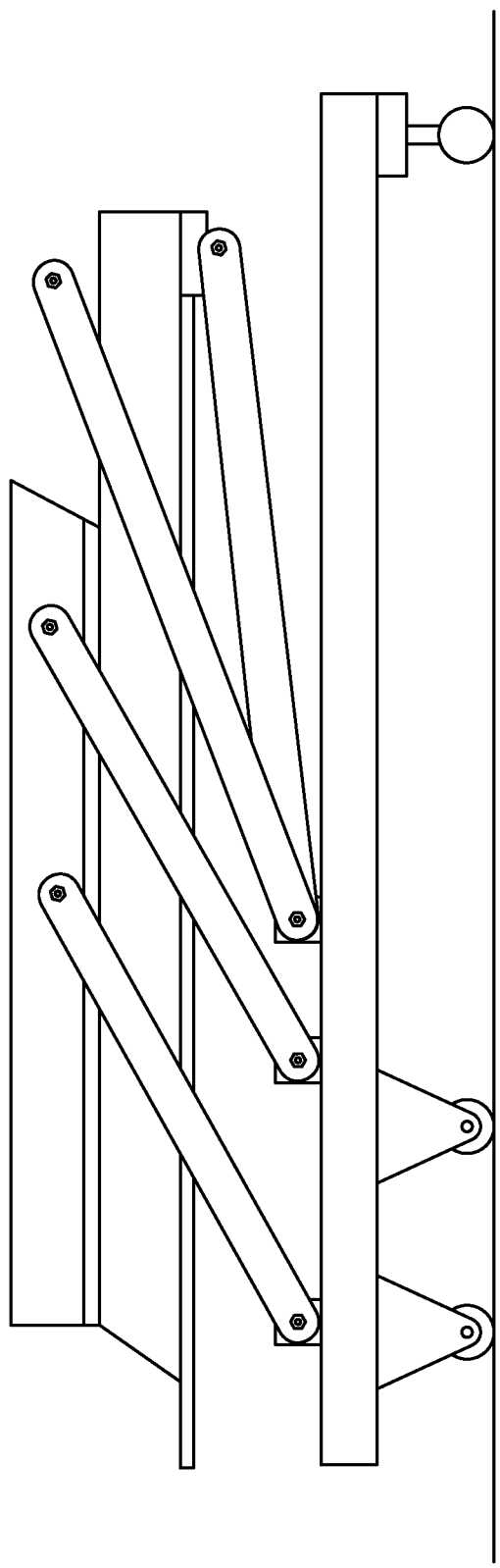
FIG. 8 is a side view of trailer and frames with the channel parts folded together to reduce length for trailing when empty.
Figure 9:
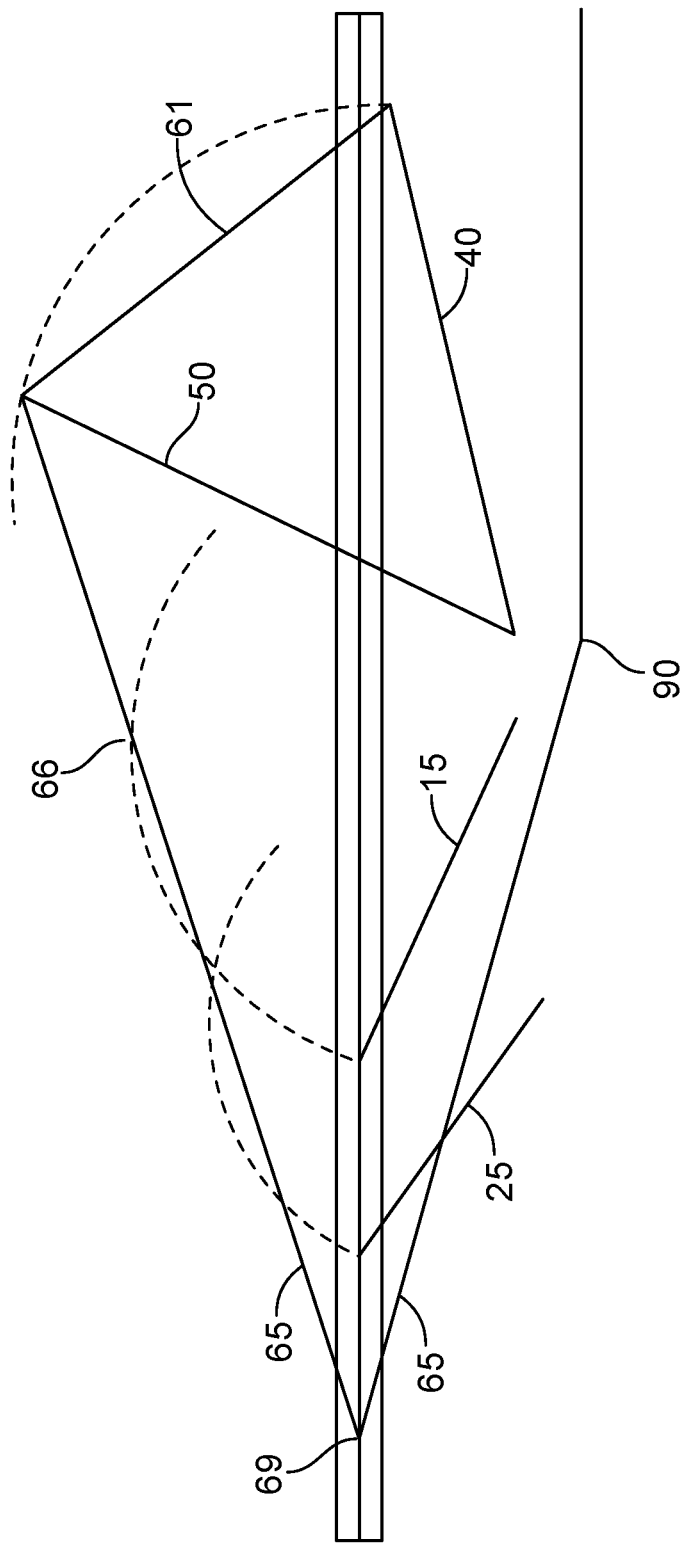
FIG. 9 is a schematic view of operating components of the invention with the mast down.
Figure 10:
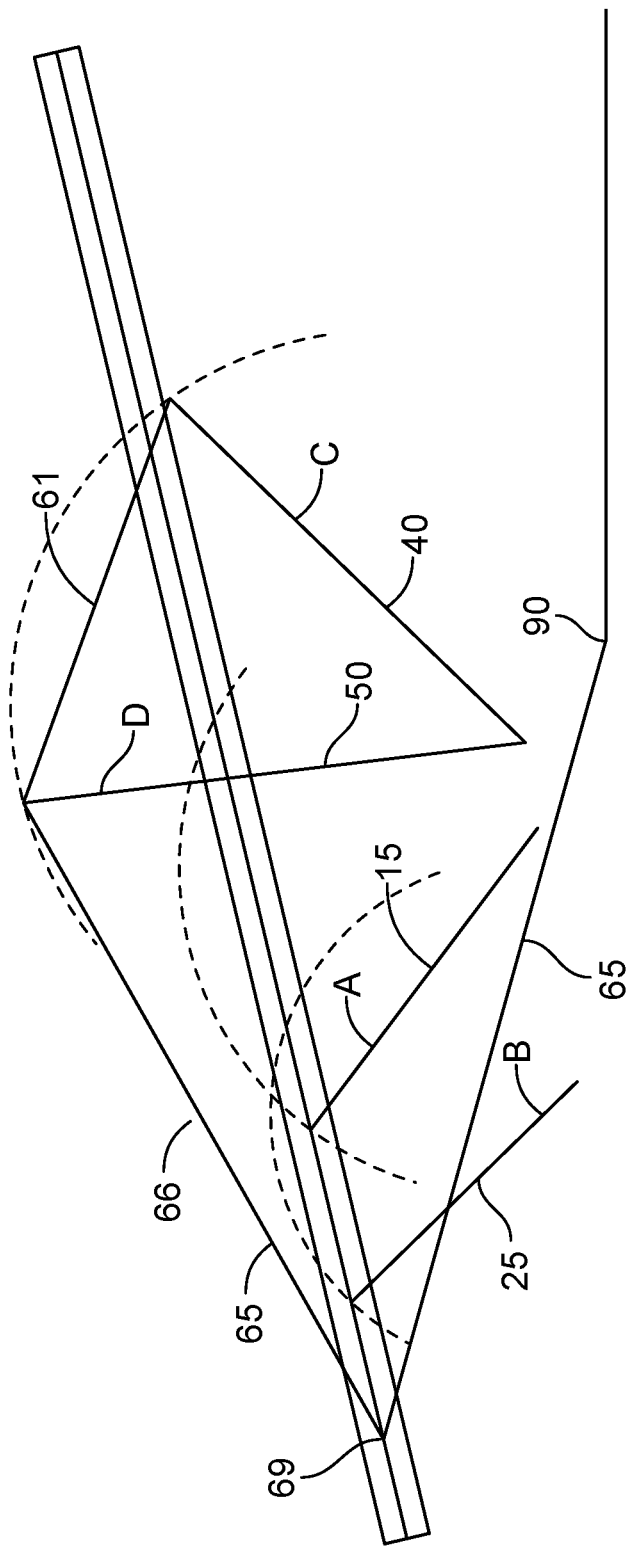
FIG. 10 is a schematic view of operating components with the mast being lifted primarily with frames C and D.
Figure 11:
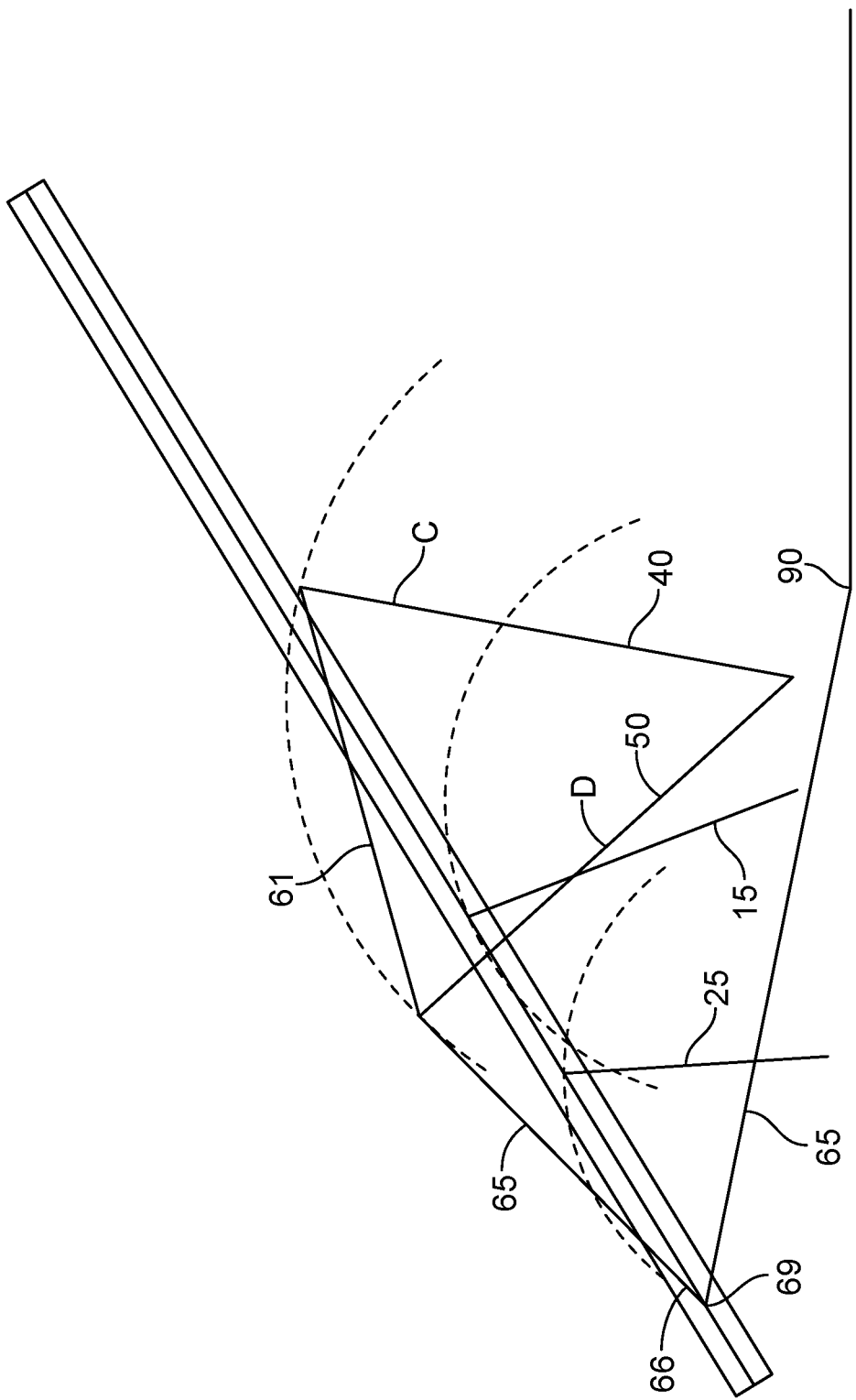
FIG. 11 is a schematic view of operating components with the mast lifted by frames C and D just before frames A and B take over the lifting operation.
Figure 12:
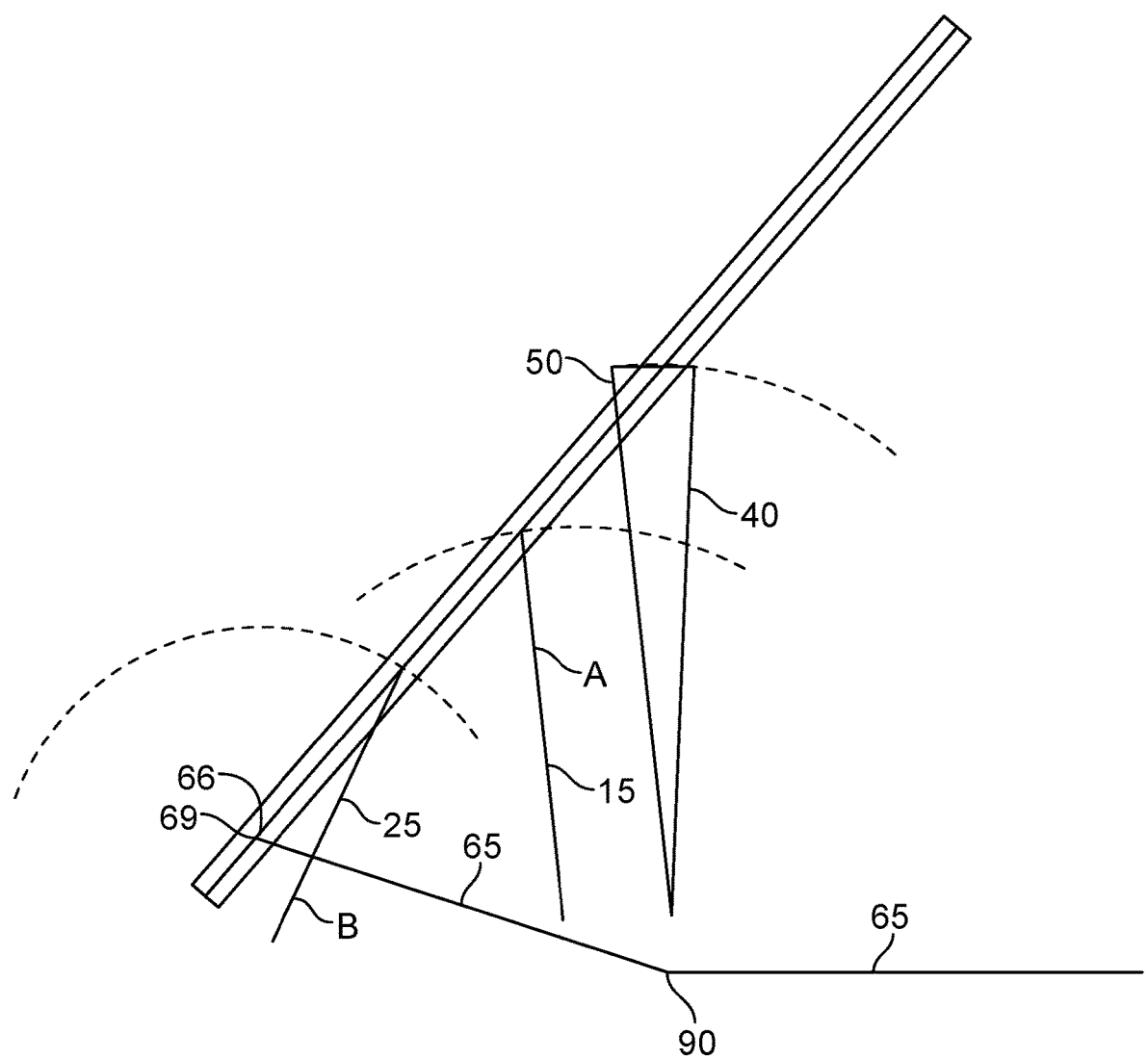
FIG. 12 is a schematic view of operating components with the mast being lifted by frames A and B.
Figure 13:
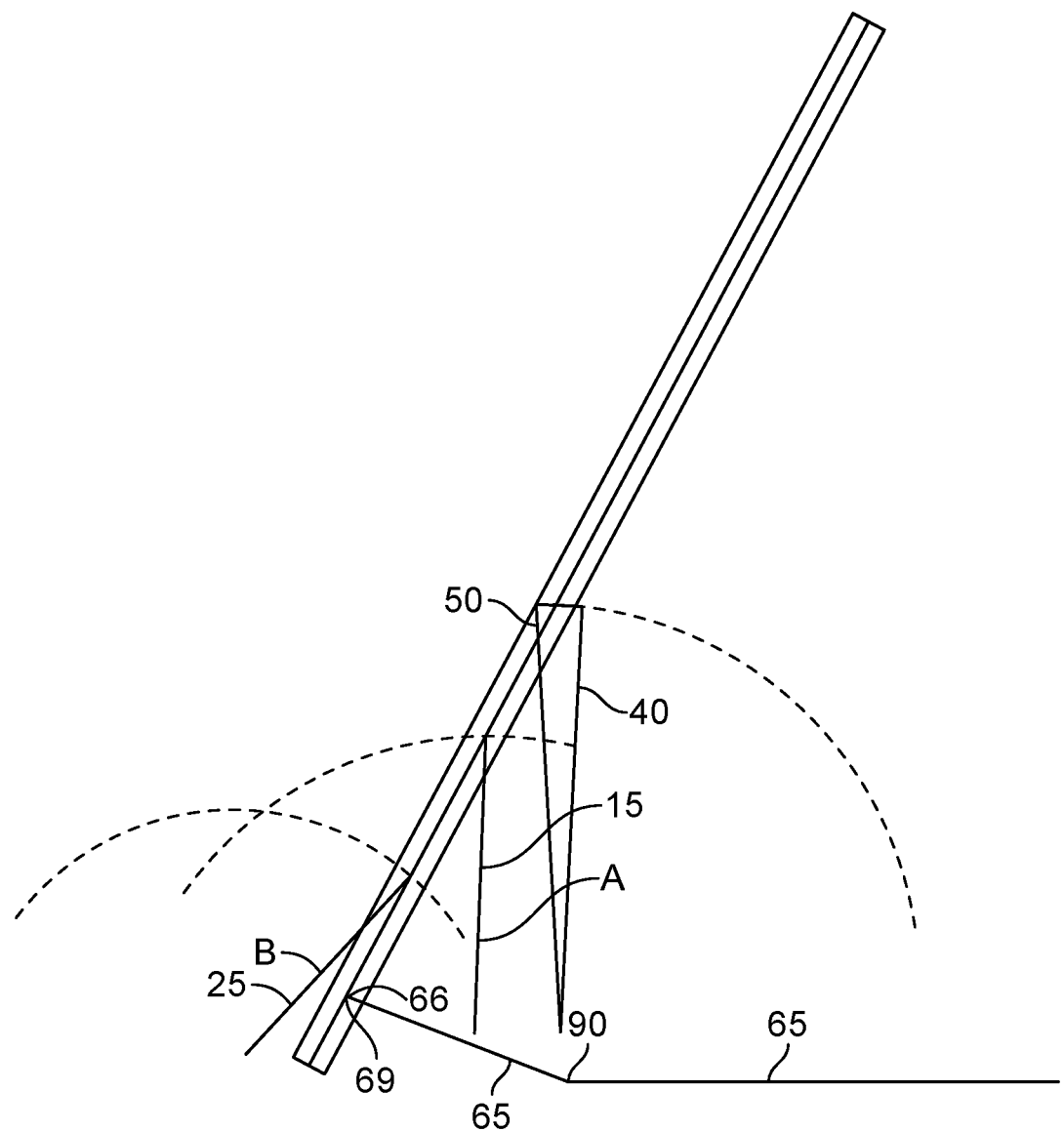
FIG. 13 is a schematic view of operating components with the mast being lifted by frames A and B.
Figure 14:
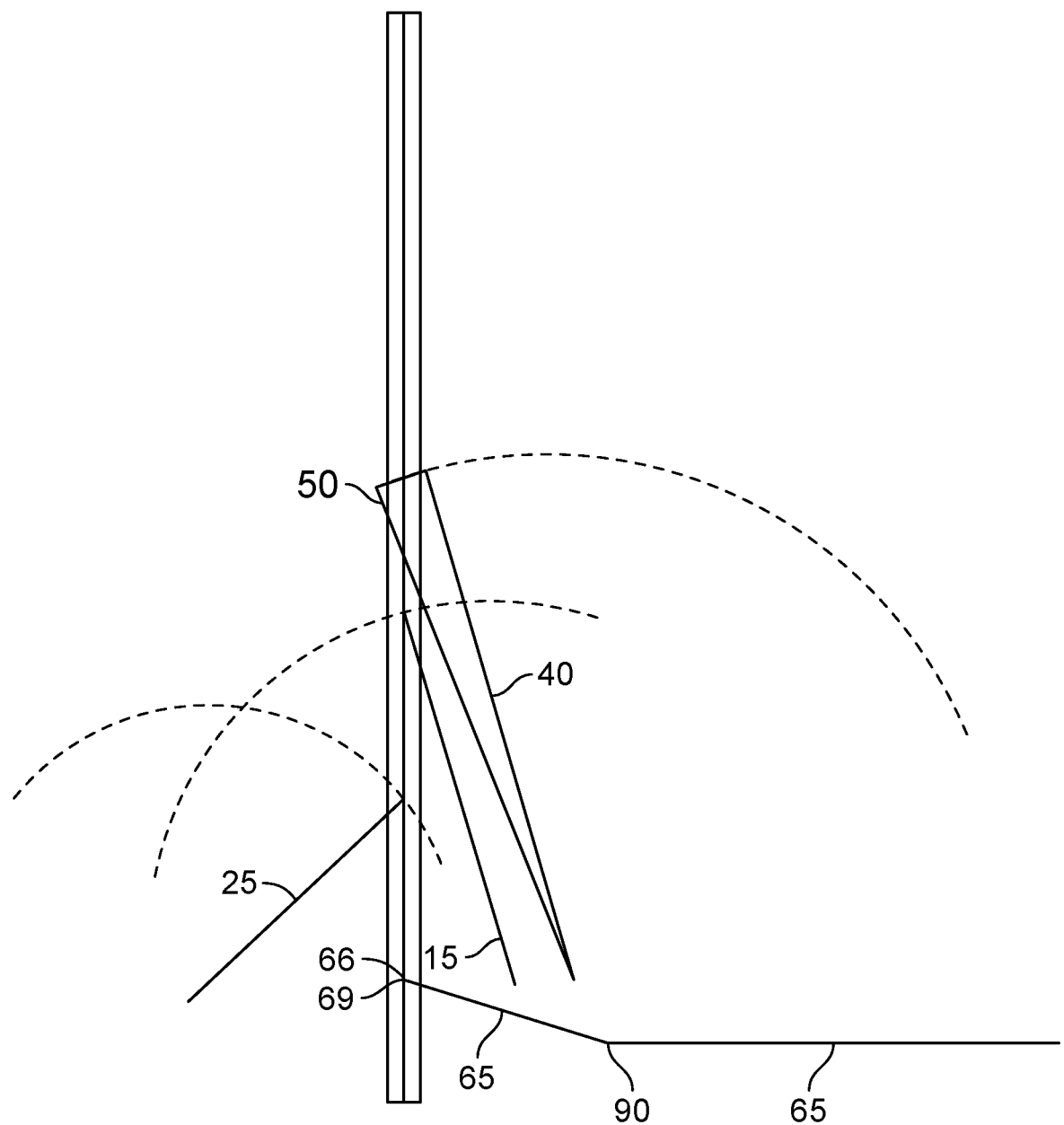
FIG. 14 is a schematic view of operating components with the mast fully raised to a vertical position.
Figure 15:
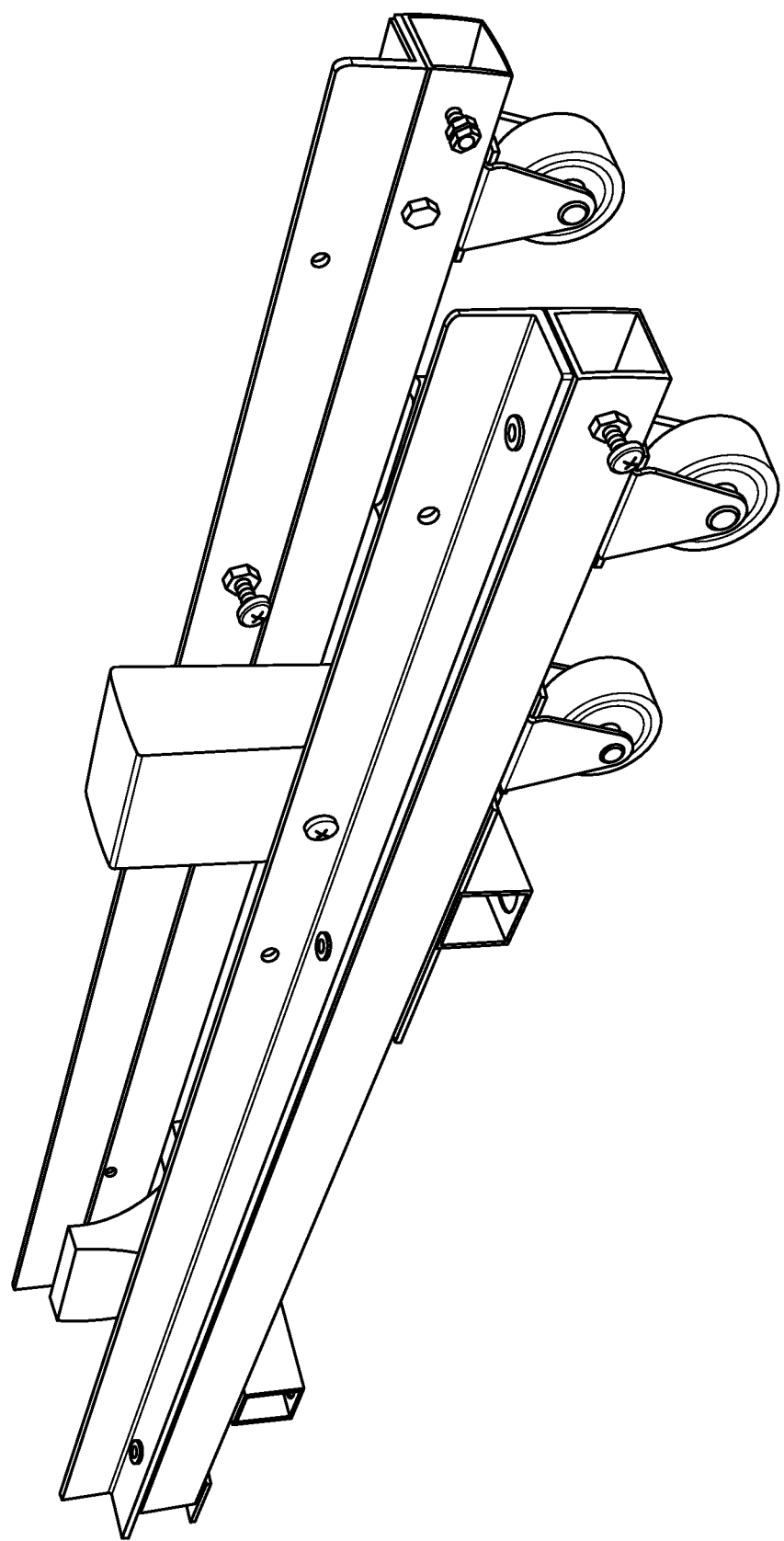
FIG. 15 is a photo of a model for the trailer.
Figure 16:
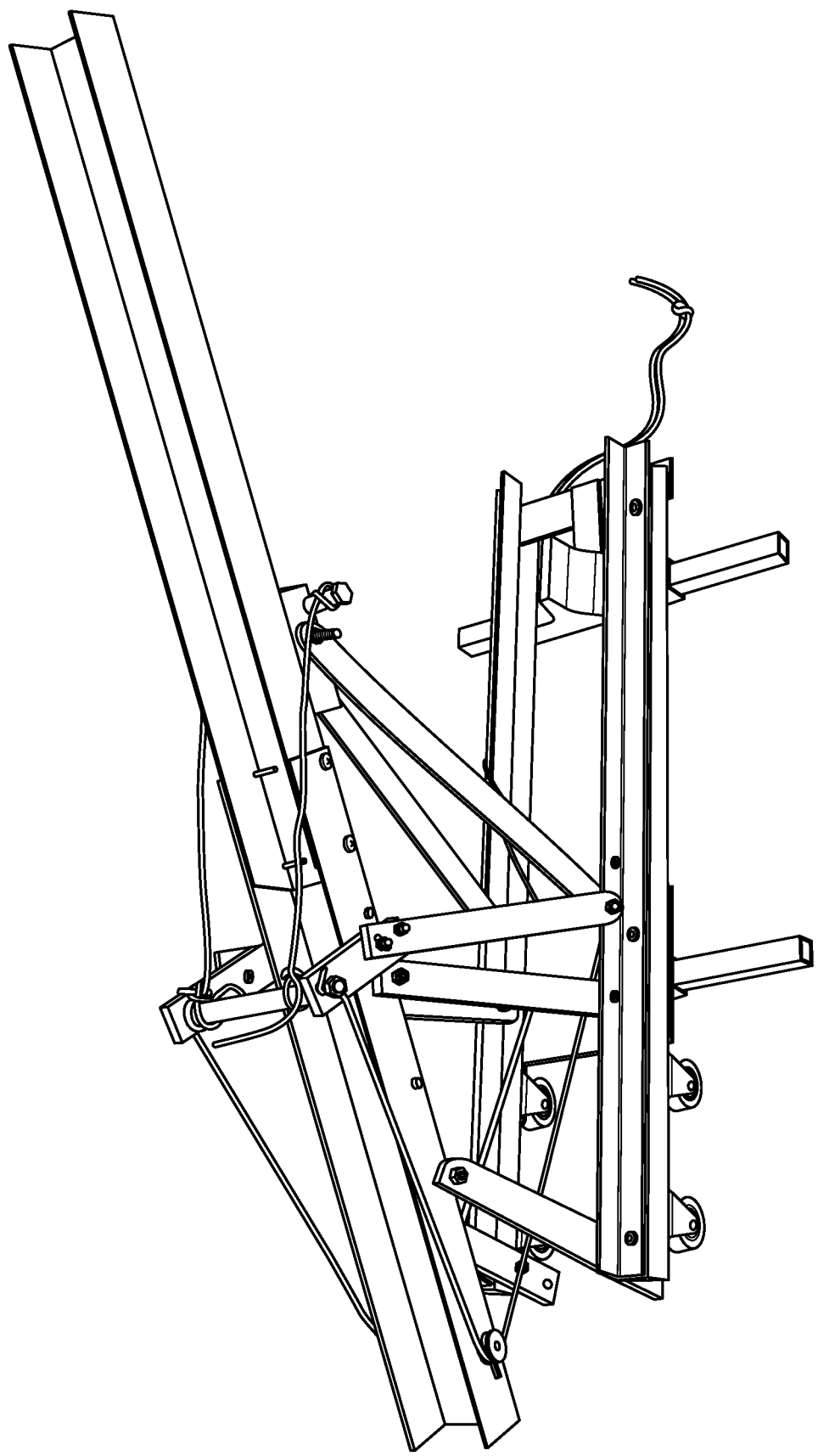
FIG. 16 is a photo of the assembled trailer model including a channel for holding the tower shown partly raised.
Figure 17:
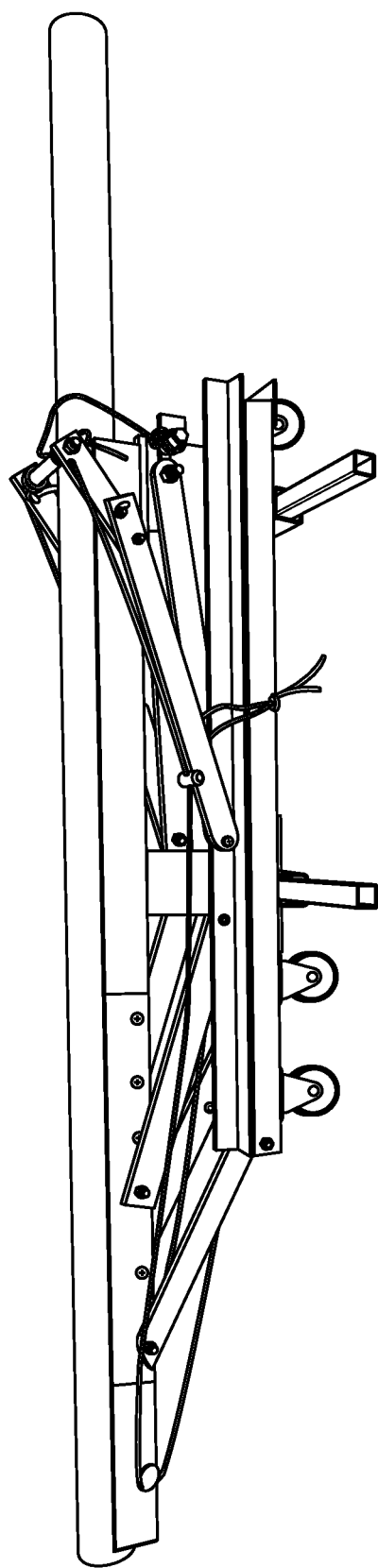
FIG. 17 is a photo of the assembled trailer model with the tower in place.
Figure 18:
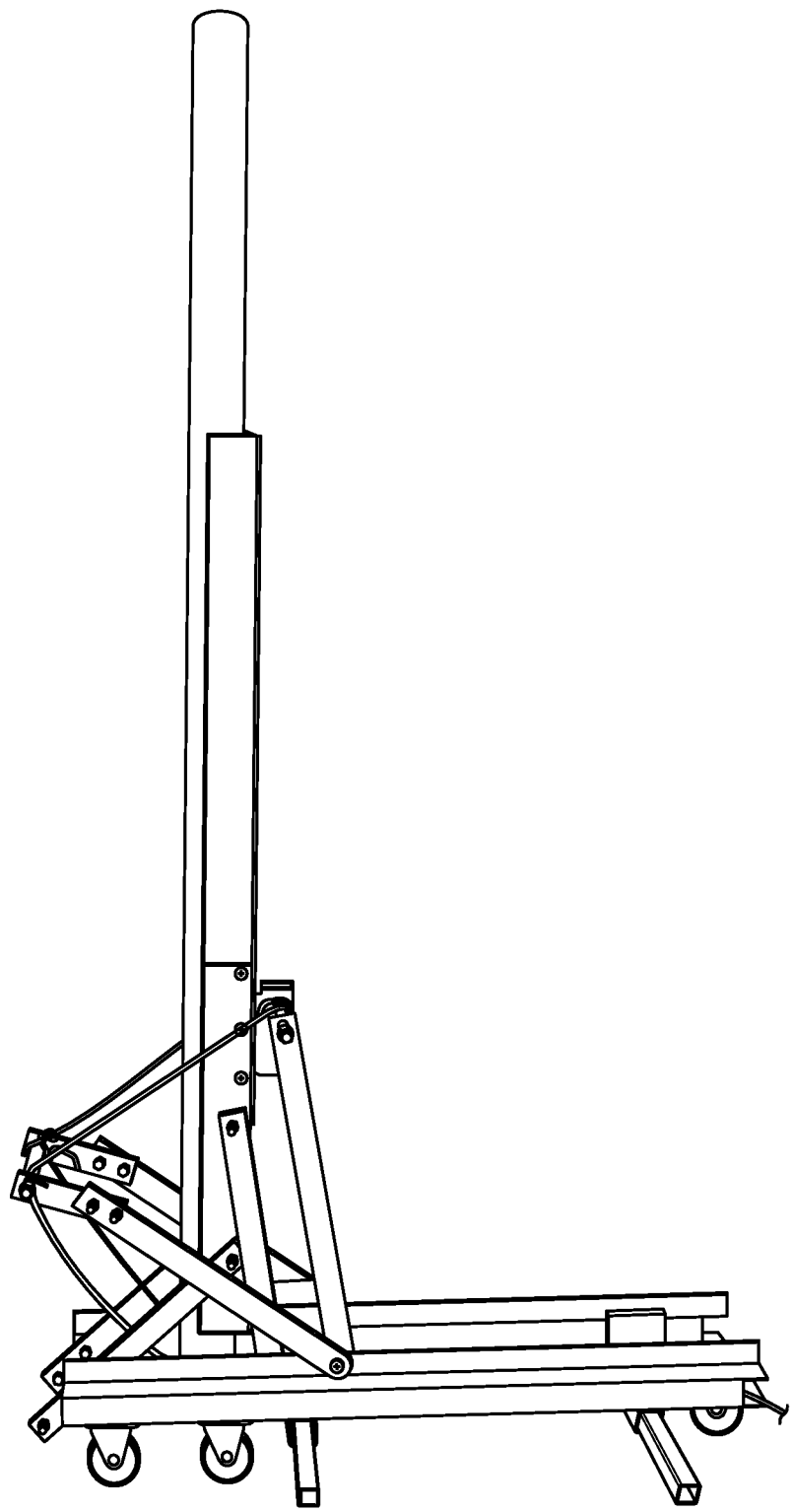
FIG. 18 is a photo showing the trailer model and the mast vertical.

Stage two pulls the mast up completely. Continued operating the electric winch, as shown in FIGS. 3 and 4, pulls the control line 65 and 64. That pulls the bottom of the of the tower channel down and then forward. Eventually the tower is vertical, as shown in FIG. 5. When the tower is vertical it will slot into a retainer on the plate that takes the support block 80, as shown in FIGS. 6A and 6B. This is a safety device to prevent the mast from moving.

When the tower is vertical over the base, the hydraulics on the trailer are operated and the trailer is lowered so that the studs on the concrete base project through a plate on the base of the tower in the same manner as found in poles that support cantilevered traffic lights. Nuts are threaded down the studs and tightened. The mast is now free standing. There are steps up the side of the tower channel to remove the tower retaining chains and unhook the bar at the top of frame D 50.

The stabilizers on the trailer are retracted and the trailer is driven away. The whole tower raising operation is very quick less than 30 minutes and requires only two people.

Hydraulic Trailer Road Ready

The tower channel that sticks out the back of the hydraulic trailer by about 15 ft can be collapsed. The struts on frame B normally pivot on the underside of the hydraulic trailer on a pivot 1 ft 3 in from its lower end. There is another pivot on the lower end of the struts of frame B. If the pivot at the end of the struts of frame B are moved to the pivot plate on the top of the side boxes 70 and 71, then frame A and Frame B make a parallelogram. The back end of tower channel can be swung up and over onto the front of the tower channel.

Model

A 26 inch scale model shown in FIGS. 15-18 of a hydraulic boat trailer without the normal boat supports was made. Struts 15, 25, 40 and 50 for frames A, B, C and D were made to go on either side of the trailer. The struts were attached to the trailer using bolts so that they could pivot front and back. 36" channels that receive the tower were also attached to the top of the struts using bolts as pivots. A 1½" iron pipe with a 2" outside diameter that represented the tower was cut 50" long. The pipe would fit inside the walls of the channel on the top of the rig.

The scale model represented a 36 ft trailer that was 8 ft wide. The iron pipe represented a tower 68 ft long. The weight of the iron pipe that represented the model tower was 11 lbs. Tests showed that an initial pull on the control line 65 of 15 lbs raised the tower in seconds. After the initial pull the load went dramatically down.

A hydraulic trailer has vertically adjustable wheels. This adjustment would allow the tower when vertical to be lowered onto the previously manufactured concrete bolting base. When the tower was bolted in place the rig could be removed.

A model trailer 300 to represent the hydraulic trailer was made from 1" aluminum box, to represent the 12 in box of a hydraulic trailer. The side frames of the model were 1" square aluminum spaced apart 4" and connected together at the front. There were wheels under the side frame and at the front to represent a hydraulic road trailer. The frames A B C and D were made with 1 in by ⅛ in aluminum strap. The tower channel was 36 in long made from 2 in angle riveted together to make a channel the width of the tower.

An ⅛" rope was connected to frame C then D that went through a turning block at the bottom of the tower channel represented the control wire. There was another turning block down beside the support blocks. There was a nut tied to the control line 10 in from frame D that represented the stop 66 and 67 on the control wire.

Alternate Guy Wire Stayed Tower

Base

It is also possible to support the tower with Guy wires. In that case the base only needs to be strong enough to support the weight of the tower.

Guy Wire Set Up to the Tower

If the tower is going to be held up by guy wires, the rough length of the guy wires needs to be calculated and installed on the side and front of the tower near the top. There needs to be two guy wires for the back of the tower that can be installed either side of the trailer to facilitate the removal of the trailer when the tower is up.

Method of Raising a Tower that is Held Up with Guy Wires

With the tower still in the down position, the side and back wires are connected to anchor points on the ground that are spaced a distance of perhaps two thirds the height of the tower away from the tower. These guy wires should be slightly long so that they can be tightened when the mast is vertical. This method of tower raising does not stop the tower going up when the guy wires are the correct length. When the tower is up the forward guy wires can be connected to the anchor point.

Once the tower is lowered to the base, all the guy wires can be tightened to hold the tower vertical. The trailer can be freed from the tower. The stabilizers on the trailer are retracted and the trailer is driven away.

While the invention has been described with reference to specific embodiments, modifications and variations of the invention may be constructed without departing from the scope of the invention, which is defined in the following claims.

I claim:

1. Apparatus comprising:
a towed trailer having front and rear ends,
parallel side box beams,
a front interconnection connecting front portions of the parallel side box beams,
an intermediate interconnection interconnecting intermediate portions of the parallel side box beams,
a first turning block on one of the box beams near the intermediate interconnection,
supports on top of interconnections,
a pole guide channel having front and rear ends for resting on the supports,
a second turning block near the rear end of the pole guide channel,
plural frames having upper and lower ends,
a first frame having a first lower end rotatably connected to the trailer near the intermediate interconnection and having a first upper end rotatably connected near the front end of the pole guide channel,
a second frame having a second lower end rotatably connected to the trailer near the first intermediate interconnection and having a second upper end,
a third frame having a third lower end rotatably connected to the trailer near the intermediate interconnection and having a third upper end rotatably connected to the pole guide channel,
a fourth frame having a fourth lower end rotatably connected to the trailer near the rear end of the trailer and having a fourth upper end rotatably connected to a rearward end of the pole guide channel,
a first flexible connector connecting the first upper end and the second upper end of the first and second frames,
a second flexible connector connected to the second upper end of the second frame, passing around the second turning block and around the first turning block and along the box beam to a winch configured for pulling in the second flexible connector,
whereby with the pulling the second frame is rotated upward, the first frame is pulled upward and the rearward end of the pole guide channel is pulled forward, thereby raising the third and fourth frames,
a stop connected to the second flexible connector and configured for abutting the second turning block,
whereby the second flexible conductor pulls the second turning block and the rearward end of the pole guide channel toward the intermediate connection, and
wherein the intermediate interconnection is configured for preventing movement of the pole guide channel beyond a point of verticality of the pole.

2. Apparatus comprising:
a pole carrier and erector over the road hydraulic trailer, further comprising:
wheel assemblies connected to the trailer,
hydraulic rams connected to the wheel assemblies and adapted for raising and lowering the trailer,
parallel spaced longitudinal beams connected to the trailer,
a frontal cross member connected between front portions of the beams,
an intermediate cross member connected between intermediate portions of the beams,
first pivot plates connected to the beams in front of the intermediate cross member,
second pivot plates connected to the beams in back of the intermediate cross member,
third pivot plates mounted near rearward ends of the beams,
a pole holder channel supported above the beams,
first pivot points connected to a frontal portion of the pole holder channel,
second pivot points connected near rearward ends of the beams,
third pivot points connected to the channel and spaced forward from the second pivot points,
a first frame having lower ends connected to the first pivot plates and having upper ends connected to the first pivot points,
a second frame having lower ends connected to the first pivot plates and having upper ends extending above the upper ends of the first frame,
a third frame having lower ends connected to the second pivot plates and having upper ends connected to the third pivot points,
a fourth frame having lower ends connected to the third pivot plates and having upper ends connected to the second pivot points,
first turning blocks mounted on the beams near the intermediate portions of the beams,
second turning blocks mounted on rearward ends of the pole holder channel,
cables connecting the upper ends of the first frame to the upper ends of the second frame,
wires connected to upper ends of the second frames passing around the second and first turning blocks and leading forward along the beams and adapted for winding on a winch to rotate the second frame rearward and upward, thereby raising the upper ends of the first frame and the front end of the channel and drawing the rear end of the channel toward the intermediate cross member and stop plates connected to the wires for preventing further travel of the wires around the turning blocks and while continuing the pulling of the rearward end of the channel toward the intermediate cross member.

3. The apparatus of claim 2, further comprising a pole having a lower end in the channel and having an upper end out of the channel.

4. The apparatus of claim 3, further comprising electronics at an upper end of the pole.

5. The apparatus of claim 4, further comprising a conductor extending from the electronics to a lower end of the pole.

6. The apparatus of claim 1, further comprising guy wires extending from a top of the pole to beyond a bottom of the pole.

7. A method comprising:
providing a towed trailer having front and rear ends,
providing parallel side box beams,
providing a front interconnection, connecting front portions of the parallel side box beams,
providing an intermediate interconnection, interconnecting intermediate portions of the parallel side box beams,
providing a first turning block on one of the box beams near the intermediate interconnection,
providing supports on top of the interconnections,
providing a pole guide channel having front and rear ends,
resting the pole guide channel on the supports,
providing a second turning block near the rear end of the pole guide channel,
providing plural frames having upper and lower ends,
providing a first frame having a first lower end rotatably connected to the trailer near the intermediate interconnection and having a first upper end rotatably connected near the front end of the pole guide channel,
providing a second frame having a second lower end rotatably connected to the trailer near the first intermediate interconnection and having a second upper end,
providing a third frame having a third lower end rotatably connected to the trailer near the intermediate interconnection and having a third upper end rotatably connected to the pole guide channel,
providing a fourth frame having a fourth lower end rotatably connected to the trailer near the rear end of the trailer and having a fourth upper end rotatably connected to a rearward end of the pole guide channel,
providing a first flexible connector, connecting the first upper end and the second upper end of the first and second frames with the first flexible connector,
providing a second flexible connector connected to the second upper end of the second frame, passing the second flexible connector around the second turning block and around the first turning block and along the box beam to a winch configured for pulling in the second flexible connector,
with the pulling, rotating the second frame upward, pulling the first frame upward and pulling the rearward end of the pole guide channel forward, and raising the third and fourth frames,
providing a stop connected to the second flexible connector and configured for abutting the second turning block,
with the stop and the second flexible conductor, pulling the second turning block and the rearward end of the pole guide channel toward the intermediate connection, and
preventing movement of the pole guide channel beyond a point of verticality of the pole with the intermediate connection.

8. The method of claim 7, further comprising providing a pole having a lower end near the channel and having an upper end extending out of the channel.

9. The method of claim 8, further comprising providing electronics at an upper end of the pole before raising the pole.

10. The method of claim 9, further comprising extending a conductor from the electronics to a lower end of the pole.

11. The method of claim 7, further comprising connecting tops of guy wires extending from a top of the pole to beyond a bottom of the pole before raising the pole.

12. The method of claim 11, further comprising anchoring distal ends of rear and side guide wires before erecting the pole.

13. The method of claim 7, further comprising lowering the trailer after positioning the pole above a base and supporting the pole on the base.

14. The method of claim 13, further comprising supporting the pole on the base before releasing the pole from the channel.

15. The method of claim 14, further comprising towing the trailer away from the supported pole.

* * * * *